United States Patent
Euler et al.

(10) Patent No.: US 9,693,027 B2
(45) Date of Patent: Jun. 27, 2017

(54) INCREASE IN DYNAMICS IN COLOR-CODED TRIANGULATION

(71) Applicant: Siemens Aktiengesellschaft, Munich (DE)

(72) Inventors: Helmuth Euler, Vaterstetten (DE); Peter Rentschler, Neuhengstett (DE); Anton Schick, Velden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/899,409

(22) PCT Filed: Jun. 11, 2014

(86) PCT No.: PCT/EP2014/062134
§ 371 (c)(1),
(2) Date: Dec. 17, 2015

(87) PCT Pub. No.: WO2014/202442
PCT Pub. Date: Dec. 24, 2014

(65) Prior Publication Data
US 2016/0156888 A1    Jun. 2, 2016

(30) Foreign Application Priority Data
Jun. 21, 2013   (DE) .................. 10 2013 211 802

(51) Int. Cl.
*G01B 11/24*   (2006.01)
*H04N 9/31*    (2006.01)
*G01B 11/25*   (2006.01)

(52) U.S. Cl.
CPC ....... *H04N 9/3182* (2013.01); *G01B 11/2509* (2013.01); *H04N 9/3194* (2013.01)

(58) Field of Classification Search
CPC ........ G02B 27/0172; G02B 2027/0138; G02B 2027/0187; G02B 2027/014;
(Continued)

(56) References Cited

U.S. PATENT DOCUMENTS

| | | | |
|---|---|---|---|
| 6,094,270 A | 7/2000 | Uomori et al. | 356/623 |
| 8,531,650 B2 | 9/2013 | Feldkhun et al. | 356/4.01 |

(Continued)

FOREIGN PATENT DOCUMENTS

| | | | | |
|---|---|---|---|---|
| DE | 102005014525 A1 | 10/2006 | | G01B 11/25 |
| DE | 112009001652 T5 | 1/2012 | | G01B 11/25 |

(Continued)

OTHER PUBLICATIONS

Pan, Jiahui et al., "Color-Coded Binary Fringe Projection Technique for 3-D Shape Measurement," Optical Engineering, vol. 44, No. 2, pp. 023606-1-023606-9 (9 pages), Feb. 2005.
(Continued)

*Primary Examiner* — Michael P Stafira
(74) *Attorney, Agent, or Firm* — Slayden Grubert Beard PLLC

(57) ABSTRACT

An arrangement is disclosed for increasing dynamics in color-coded triangulation by using an adapted narrow band color filter. Spectral passage ranges of the color filter overlap with sensitive spectral ranges of a camera sensor. However, the spectral passage ranges are, in contrast to the sensitive spectral ranges of the camera sensor, spectrally disjunct, and the transmitted colors can therefore be clearly identified.

9 Claims, 2 Drawing Sheets

(58) Field of Classification Search
CPC ........ G02B 27/0093; G02B 2027/0178; G02B 27/017; G02B 2027/0134; G02B 2027/0147; G02B 27/0101; G02B 2027/0118; G02B 2027/0141
See application file for complete search history.

(56) References Cited

U.S. PATENT DOCUMENTS

| | | | |
|---|---|---|---|
| 2004/0125205 A1 | 7/2004 | Geng et al. | 348/142 |
| 2012/0086950 A1* | 4/2012 | Sho | G01B 11/2509 356/601 |
| 2012/0092463 A1* | 4/2012 | Liu | G06T 7/0057 348/50 |
| 2012/0120413 A1* | 5/2012 | Bellis | G01B 11/2513 356/603 |
| 2012/0154576 A1* | 6/2012 | Weston | G01B 11/007 348/136 |
| 2012/0229606 A1 | 9/2012 | Rodrigue et al. | 348/46 |
| 2012/0229816 A1 | 9/2012 | Rodrigue et al. | 356/610 |

FOREIGN PATENT DOCUMENTS

| | | | |
|---|---|---|---|
| EP | 0076866 A1 | 4/1983 | G01B 11/02 |
| WO | 2009/046730 A1 | 4/2009 | G01B 11/25 |
| WO | 2014/202442 A1 | 12/2014 | G01B 11/25 |

OTHER PUBLICATIONS

Zhang, Zonghua et al., "Snapshot Color Fringe Projection for Absolute Three-Dimensional Metrology of Video Sequences," Applied Optics, Optical Society of America, Washington, DC; vol. 49; No. 31; pp. 5947-5953 (7 pages), Oct. 20, 2010.
German Office Action, Application No. 102013211802.3, 5 pages, Sep. 23, 2013.
International Search Report and Written Opinion, Application No. PCT/EP2014/062134, 15 pages, Oct. 9, 2014.

* cited by examiner

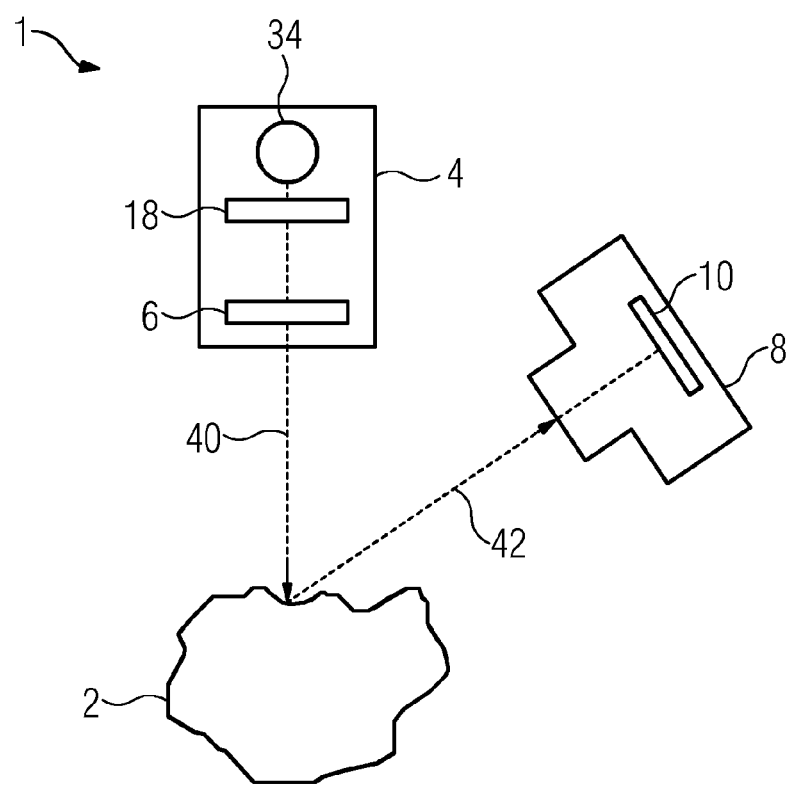

INCREASE IN DYNAMICS IN COLOR-CODED TRIANGULATION

CROSS-REFERENCE TO RELATED APPLICATIONS

This application is a U.S. National Stage Application of International Application No. PCT/EP2014/062134 filed Jun. 11, 2014, which designates the United States of America, and claims priority to DE Application No. 10 2013 211 802.3 filed Jun. 21, 2013, the contents of which are hereby incorporated by reference in their entirety.

TECHNICAL FIELD

The invention relates to an arrangement for measuring the surface of an object by means of color-coded triangulation.

BACKGROUND

Optical triangulation methods are used in a variety of ways in order to contactlessly measure the surfaces or the entire geometrical shape of three-dimensional objects. In general, triangulation is a geometrical method of optical distance measurement by angle measurement within triangles. The calculation is in this case carried out by means of trigonometric functions. In general, distinction is made between passive and active triangulation methods. In contrast to passive methods, active methods have a projector unit which projects structured light onto the surface of an object. The projector unit may be a projector or a laser, or a laser diode. According to the prior art, light is projected onto the surface of an object to be measured. The scattered light is subsequently recorded at a fixed angle, the triangulation angle, by means of a camera and analyzed. The connecting line between the light source and the camera, and the two light beams from and to the object to be measured span a triangle, so that, with a known distance between the light source and the camera and known beam directions, the distance between the camera and the object can be determined.

For three-dimensional measurement by means of color-coded triangulation, a pattern of colored stripes, which is produced for example by means of a transparency, is typically projected with a predetermined beam direction onto the object to be measured. It is advantageous that spatial positions in the projector are represented with color coding on the object surface. The colored scattered light is subsequently analyzed by means of a camera at a fixed angle. Because of the curved shape of the object surface, the colored stripes experience a position-dependent phase shift, from which the shape of the surface can ultimately be determined. However, the colored stripes in the image of the scattered light are subject to brightness modulations that result from locally color-dependent absorption and reflectivity on the object surface. Furthermore, a superposition with the usually colored light from the surroundings always takes place. Thus, for example, there may be a shift of the colors in the color space in the image or the individual colors may become difficult to identify because of the loss of brightness. According to the prior art, an attempt is made to compensate for this by HDR cameras. Particularly for medical applications, however, it has not yet been possible to use this technology because of the rapid object movements.

On the camera sides, image sensors with an upstream Bayer sensor are used according to the prior art. The Bayer sensor in this case has three sensitive spectral ranges, which usually lie in the blue, green and red. The colored light of the image of the object surface can therefore be spectrally filtered according to color before it strikes the photosensitive surfaces of the image sensor. However, the arrangement for determining the color is very inaccurate since, as is known, crosstalk of the colors can occur in a Bayer sensor. As an alternative to cameras with a Bayer sensor, it is also possible to use 3-chip cameras, the color separation of which is somewhat better in comparison. The unsharp selection or separation of the colors leads as a consequence to measurement discrepancies in the determination of the three-dimensional shape of the object to be measured. In the case of a red projected stripe, for example, a green signal may even result because of an overlap of the sensitive regions of the Bayer sensor. In the case of object surfaces which have a large contrast dynamic range, this leads to an erroneous evaluation of the color of a stripe and therefore to missing surface regions, which may need to be filled in by multiple scans with different triangulation angles.

SUMMARY

One embodiment provides an arrangement for color-coded triangulation of an object to be measured, comprising a projector unit for projecting a color pattern onto an object surface of the object to be measured, at least one camera with a camera sensor, for recording an image of the color pattern projected onto the surface, the camera sensor being sensitive in a first, in at least one second and a third spectral range, the sensitive spectral ranges being arranged according to increasing wavelengths, comprising at least one color filter which has a first, at least one second and a third spectral transmission range, the spectral transmission ranges being separated pairwise, an upper edge wavelength of the first transmission range lying within the first sensitive spectral range of the camera sensor, a lower and upper edge wavelength of the at least one second transmission range lying within the at least one second sensitive spectral range, and a lower edge wavelength of the third transmission range lying within the third sensitive spectral range of the camera sensor.

In a further embodiment, the spectral distance of adjacent edge wavelengths is at least 10 nm, in particular 30 nm.

In a further embodiment, the first spectral transmission range of the color filter lies below 480 nm, at least one second spectral transmission range of the color filter lies within the spectral range of from 520 nm to 565 nm, and the third spectral transmission range of the color filter lies above 600 nm.

In a further embodiment, the camera comprises the color filter.

In a further embodiment, the projector unit comprises the color filter.

In a further embodiment, the color filter is fitted inside the projector unit between a light source and a transparency.

In a further embodiment, the light source of the projector unit is configured as a laser light source and comprises at least one laser.

In a further embodiment, the light source of the projector unit comprises three laser light sources, the wavelengths of which lie in the blue, green and red light spectra.

In a further embodiment, the light source of the projector unit is configured as a DLP projector.

BRIEF DESCRIPTION OF THE DRAWINGS

Example aspects and embodiments of the invention are explained below with reference to the drawings, in which:

FIG. 3 shows a second embodiment of the color-coded triangulation, in which the color filter is fitted inside the projector unit.

DETAILED DESCRIPTION

Figure 1:
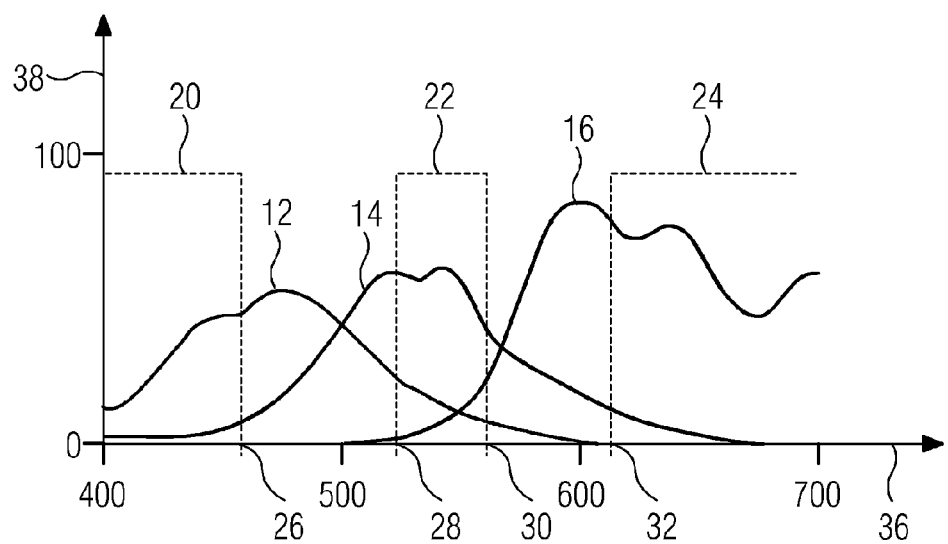
FIG. 1 illustrates the sensitive spectral ranges of a Bayer sensor and the spectral transmission ranges of the color filter.

Embodiments of the present invention provide a triangulation arrangement which allows robust separation of spectral ranges during the analysis of an image of a color pattern projected onto the surface of an object to be measured.

Some embodiments provide a projector unit and at least one camera with a camera sensor, the projector unit projecting a color pattern onto a surface of an object to be measured. The camera is used to record an image of the color pattern projected onto the surface. The camera sensor is transmissive for light, or sensitive, in a first, in at least one second and a third spectral range, the sensitive spectral ranges being arranged according to increasing wavelengths. The arrangement furthermore comprises a color filter which is transmissive in a first, in at least one second and a third spectral transmission range, the individual spectral transmission ranges of the color filter being separated pairwise. An upper edge wavelength of the first spectral transmission range lies in the first sensitive spectral range of the camera sensor. A lower and upper edge wavelength of the at least one second spectral transmission range lie in a second sensitive spectral range of the camera sensor, and a lower edge wavelength of the third spectral transmission range lies in the third sensitive spectral range of the camera sensor.

The camera sensor may have a multiplicity of second sensitive spectral ranges. The color filter may also comprise a multiplicity of second transmission ranges. In this case, the lower and upper edge wavelengths of the second transmission ranges lie respectively in one of the second spectral ranges of the camera sensor. Expediently, camera sensors with four sensitive spectral ranges are used, so that there are two second spectral ranges. The two second spectral ranges therefore lie spectrally between the first and third spectral ranges of the camera sensor.

In one configuration, the color filter is fitted in such a way that the colored light of the image of the surface passes first through the color filter and then through the camera sensor, in particular a Bayer sensor.

In one configuration, the color filter is integrated in the checkerboard color pattern of the Bayer sensor. The color filter has at least three spectral transmission ranges which are separated pairwise, and which advantageously lie in the green, blue and red light spectra. It is advantageous to make the spectral transmission ranges narrowband with a high edge steepness.

The transmission range of the color filter is intended to mean that spectral range which is limited by a lower and upper edge wavelength. The upper and lower edge wavelengths are the wavelengths at which the transmission of the color filter has respectively fallen to half the maximum transmission. The lower edge wavelength in this case has a shorter wavelength than the upper edge wavelength. Typically, the transmission range of the color filter is referred to as the width at half maximum.

Advantageously, by the spectral position of the edge wavelengths of the transmission ranges in relation to the sensitive spectral ranges of the camera sensor, a transmitted color of the image can be assigned robustly to a spectral transmission range and therefore uniquely to a sensitive spectral range of the camera sensor. It is particularly advantageous that crosstalk of the colors can therefore be prevented during the recording by the camera, so that the measurement accuracy as well as the dynamic range are increased. It is expedient for the wavelength ranges which overlap in the camera sensor due to the use of the filter during the recording are not taken into account. For example, the primary colors blue, green and red as well as secondary colors such as cyan, magenta and white can therefore be separated well. In the ranges outside the spectral transmission ranges of the color filter, it is advantageous to limit the transmission of the latter at least to 3%. Limitation of the transmission to less than or equal to 1% is particularly expedient.

In one configuration, the spectral distance of adjacent edge wavelengths may be at least 10 nm. In this way, a high luminous efficiency is possible. 30 nm is particularly advantageous. In this way, good spectral separation is achieved so that the colors can be identified, or separated, robustly.

One configuration uses a color filter of which the first spectral transmission range lies below 480 nm in the blue spectral range, the at least second spectral transmission range of the color filter lies in the green between 520 nm and 565 nm, and the third spectral transmission range of the color filter lies in the red spectral range above 600 nm. In this way, the spectral distance of adjacent edge wavelengths is more than 30 nm, so that unique assignment of the colors is made possible. Furthermore, the transmission ranges respectively lie within the sensitive spectral ranges of a typical camera sensor. The spectral transmission ranges of the color filter are then adapted to a typical camera sensor, in particular to a typical Bayer sensor. It is advantageous that the color filter and camera sensor act in combination as an optimized camera sensor which has uniquely separated spectral ranges. It is particularly advantageous that wavelength ranges which overlap in a typical camera sensor, for example in a 3-chip camera, are not taken into account. In this way, the detection reliability of the colors is increased.

In one configuration, the camera comprises the color filter, so that in particular the light of the image passes first through the color filter and then through the camera sensor. In a particularly advantageous configuration, the color sensor is adapted to the checkerboard color pattern of a Bayer sensor and is integrated therein. The color filter may also be integrated in an overall camera sensor. The color filter and the camera sensor therefore form an effective narrowband camera sensor, or an effective narrowband Bayer sensor. In this way, the detection reliability of the colors, and consequently the measurement accuracy, are increased.

In one configuration, the projector unit comprises the color filter. In this way, the light emerging from the projector unit can be spectrally broadened before it strikes the surface of an object to be measured.

The color filter may advantageously be fitted inside the projector unit between a light source and a transparency with a color pattern. In this way, the light from the light source is already spectrally broadened before the transparency with the color pattern, so that robust assignment of the colors by the camera sensor is possible. In a particularly advantageous configuration, a second color filter is fitted inside the housing of the camera so that a filtering of the colors respectively takes place before the projection of the color pattern onto the object and before the detection of the image by the camera. In this way, the influence of colored ambient light on the detection reliability of the colors is reduced.

The light source of the projector unit may be configured as a laser light source and comprises at least one laser. In an advantageous configuration, the wavelength of the laser lies in a spectral transmission range of the color filter. In this way, the color filter is assisted in the robust spectral separation of the colors.

The light source of the projector unit may comprise three laser light sources, the wavelengths of which lie in the blue, green and red light spectra. Advantageously, the wavelength of the blue laser source lies within the first spectral transmission range of the color filter, the wavelength of the green laser light source lies within a second spectral transmission range, and the wavelength of the red laser source lies within the third spectral transmission range. In this way, the color filter is assisted in the robust spectral separation of the colors.

The projector unit may be configured as a DLP projector. In an advantageous configuration, a color wheel present in the DLP projector is expediently replaced with the color filter, or integrated into an existing color wheel. In this way, the colors used for the projection are spectrally limited so that robust assignment of the colors is possible during the analysis of the image by the camera.

FIG. 1 shows a spectrum which illustrates the spectral positions of a first, second and third sensitive spectral range 12, 14, 16 of a typical Bayer sensor 10 and a first, second and third transmission range 20, 22, 24 of a color filter 18. The sensitive spectral ranges 12, 14, 16 of the Bayer sensor 10 are represented as solid lines, while the spectral transmission ranges 20, 22, 24 of the color filter 18 are represented as dashed lines in a rectangular shape. The abscissa 36 indicates the wavelength in nm. The ordinate 38 indicates the transmissivities of the Bayer sensor 10 and of the color filter 18 in %. In this exemplary embodiment, the first sensitive spectral range 12 of the Bayer sensor 10 lies in the blue light spectrum, the second sensitive spectral range 14 lies in the green light spectrum and the third sensitive spectral range 16 lies in the red light spectrum. A first, second and third spectral transmission range 20, 22, 24 of the color filter 18 likewise lie in the blue, green and red light spectra. According to the invention, an upper edge wavelength 26 of the first spectral transmission range 20 lies inside the first sensitive spectral range 12 of the Bayer sensor 10. An upper and lower edge wavelength 28, 30 of the second spectral transmission range 22 lie within the second sensitive spectral range 14 of the Bayer sensor 10. A lower edge wavelength 32 of the third transmission range 24 lies inside the third sensitive spectral range 16 of the Bayer sensor 10. For example, the upper spectral transmission range 20 lies in the vicinity of 460 nm. The lower and upper edge wavelength 26 of the first edge wavelengths 28, 30 of the second spectral transmission range 22 then preferably lie in the vicinity of 520 nm and 560 nm, respectively, and the lower edge wavelength 32 of the third spectral transmission range 24 lies in the vicinity of 610 nm. In this way, the spectral transmission ranges 20, 22, 24 of the color filter 18 are separated and furthermore have a spectral distance of 60 nm and 50 nm in this example. Thus, when for example light passes through the color filter 18, a robust detection reliability of the colors is accordingly ensured. Furthermore a sensitive spectral range 12, 14, 16 of the Bayer sensor 10 can be assigned uniquely to the colors transmitted by the color filter 18. The color filter 18 is adapted to the Bayer sensor 10 in this sense in particular.

Figure 2:
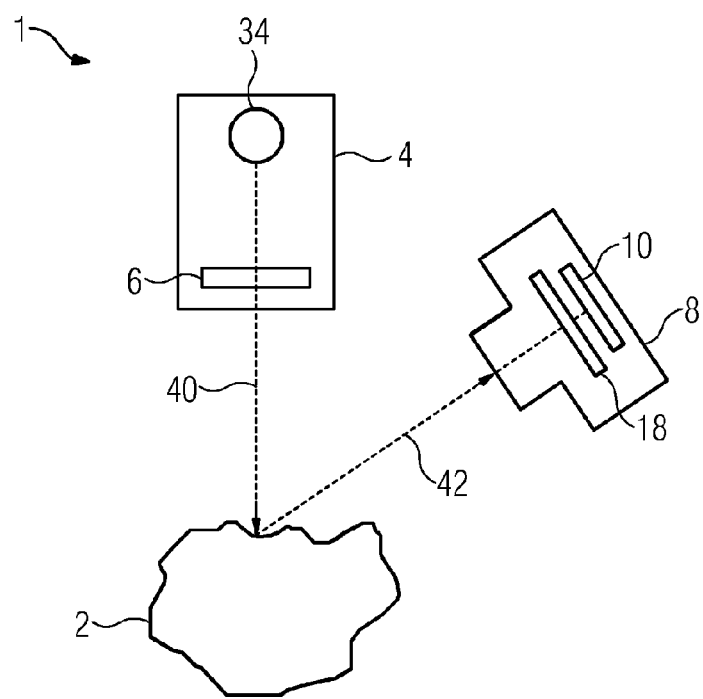
FIG. 2 shows a first embodiment of the color-coded triangulation, in which the color filter is fitted in the housing of the camera.

FIG. 2 shows a first arrangement 1 for color-coded triangulation of an object 2 to be measured. The arrangement 1 comprises a projector unit 4 with a light source 34 and a transparency 6. The light source 34 is for example a white light lamp and therefore contains all the colors of the light spectrum. In particular blue, green and red, which are preferably present in equal proportions. The transparency 6 has a color pattern, which preferably consists of blue, green and red colored stripes. The arrangement 1 furthermore comprises a camera 8 with a camera sensor 10, in particular with a Bayer sensor. The color filter 18 is, for example, fitted inside the camera housing and lies in front of the camera sensor 10 in relation to a second beam direction 42. The projector unit 4 projects the color stripes produced by the transparency 6 along a first beam direction 40 onto the surface of the object 2 to be measured. The light, scattered along a second beam direction 42, of the image of the object surface is recorded by the camera 8 after it has passed through the color filter 18 and has struck the camera sensor 10. In this way, the light of the image of the object surface is divided into three uniquely assignable spectral ranges before being recorded by the camera 8, these assigned spectral ranges corresponding to the spectral transmission ranges 20, 22, 24 of the color filter 18.

FIG. 3 shows a second arrangement 1 for color-coded triangulation of an object 2 to be measured. FIG. 2 contains the same elements as FIG. 3, which are provided with the same references. As an alternative to FIG. 2, in FIG. 3 the color filter 18 is fitted inside the projector unit 4 between the light source 34 and the transparency 6. The color filter 18 therefore lies before the light source 34 and after the transparency 6 in relation to the first beam direction 40. In this way, light which emerges from the light source 34 along the first beam direction 40, is already spectrally broadened, in accordance with the spectral transmission ranges 20, 22, 24 of the color filter 18, before the projection of the color stripes.

What is claimed is:

1. A system for color-coded triangulation of an object to be measured, the device comprising:
   a projector unit that projects a color pattern onto an object surface of the object to be measured,
   a camera having a Bayer sensor configured to record an image of the color pattern projected onto and reflected from the surface, wherein the Bayer sensor is sensitive in a first spectral range, at least one second spectral range, and a third spectral range, the first, second, and third sensitive spectral ranges being arranged in order according to increasing wavelengths,
   a first color filter arranged inside the projector unit between a light source and a transparency, the first color filter having a first spectral transmission range, at least one second spectral transmission range, and a third spectral transmission range, the first, second, and third spectral transmission ranges being separated pairwise, wherein an upper edge wavelength of the first transmission range lies within the first sensitive spectral range of the camera sensor, a lower and upper edge wavelength of the at least one second transmission range lies within the at least one second sensitive spectral range, and a lower edge wavelength of the third transmission range lies within the third sensitive spectral range of the camera sensor, and
   a second color filter integrated in a checkerboard color pattern of the Bayer sensor.

2. The system of claim 1, wherein the spectral distance of adjacent edge wavelengths is at least 10 nm.

3. The system of claim 1, wherein:
   the first spectral transmission range of the color filter lies below 480 nm, at least one second spectral transmission range of the color filter lies within the spectral range of from 520 nm to 565 nm, and the third spectral transmission range of the color filter lies above 600 nm.

4. The system of claim 1, wherein the projector unit comprises the color filter.

5. The system of claim 1, wherein the light source of the projector unit comprises a laser light source including at least one laser.

6. The system of claim 5, wherein the light source of the projector unit comprises three laser light sources having wavelengths that lie in the blue, green, and red light spectra.

7. The system of claim 1, wherein the light source of the projector unit is configured as a DLP projector.

8. The system of claim 1, wherein the spectral distance of adjacent edge wavelengths is 30 nm.

9. The system of claim 1, comprising at least two cameras.

* * * * *